(12) United States Patent
Inomata

(10) Patent No.: US 6,507,386 B2
(45) Date of Patent: *Jan. 14, 2003

(54) IMAGE FORMING APPARATUS FEATURING A DRIVING FORCE TRANSMITTING PORTION SUBSTANTIALLY COAXIAL WITH A DEVELOPING UNIT

(75) Inventor: Mitsugu Inomata, Susono (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,428

(22) Filed: Jul. 28, 1998

(65) Prior Publication Data

US 2002/0021421 A1 Feb. 21, 2002

(30) Foreign Application Priority Data

Jul. 29, 1997 (JP) ................................................ 9-219245

(51) Int. Cl.⁷ ...................... G03B 27/32; G03G 15/04; G03G 15/00
(52) U.S. Cl. ........................ 355/27; 399/119; 399/110
(58) Field of Search ............................ 355/27, 88, 109, 355/110; 399/13, 119, 110; 358/300

(56) References Cited

U.S. PATENT DOCUMENTS

| | | | | |
|---|---|---|---|---|
| 5,495,327 A | * | 2/1996 | Inomata | 355/210 |
| 5,528,343 A | * | 6/1996 | Tada et al. | 355/200 |
| 5,617,188 A | * | 4/1997 | Inomata | 399/13 |
| 5,940,664 A | * | 8/1999 | Sugihara et al. | 399/227 |
| 6,314,255 B1 | * | 11/2001 | Yokomori et al. | 399/119 |

* cited by examiner

Primary Examiner—Russell Adams
Assistant Examiner—Peter B. Kim
(74) Attorney, Agent, or Firm—Fitzpatrick, Cella, Harper & Scinto

(57) ABSTRACT

An image forming apparatus including a photosensitive member and a support portion for detachably supporting a developing unit for developing a latent image formed on the photosensitive member. The support portion supports the developing unit in a pivotable manner. A driving force transmitting portion disposed on an axis substantially the same as a pivot axis of the developing unit supported by the support portion is adapted to transmit a driving force to the developing unit supported by the support portion.

23 Claims, 18 Drawing Sheets

IMAGE FORMING APPARATUS FEATURING A DRIVING FORCE TRANSMITTING PORTION SUBSTANTIALLY COAXIAL WITH A DEVELOPING UNIT

BACKGROUND OF THE INVENTION

1. Field of the Invention

The present invention relates to an image forming apparatus. The image forming apparatus may be an electrophotographic image forming apparatus, for example. The "electrophotographic image forming apparatus" is an apparatus in which an image is formed on a recording medium by using an electrophotographic image forming system and includes an electrophotographic copying machine, an electrophotographic printer (laser beam printer, LED printer), an electrophotographic facsimile, and an electrophotographic word processor and the like, for example. Further, the present invention relates to an image forming apparatus which has a plurality of developing units capable of being detachably mounted to a main body of the apparatus and in which the plurality of developing units are successively switched by a switch means to form a multicolor image on a recording medium.

2. Related Background Art

In the past, an image forming apparatus in which a developing unit can be detachably mounted to a main body of the apparatus has been proposed. Particularly, in many image forming apparatuses for forming a multicolor image on a recording medium, developing units containing respective color developers can be detachably mounted to a main body of the apparatus.

Such developing units require a driving force for developing a latent image formed on a photosensitive member.

SUMMARY OF THE INVENTION

An object of the present invention is to provide an image forming apparatus which can surely transmit a driving force to developing units which can be detachably mounted to a main body of the apparatus.

Another object of the present invention is to provide an image forming apparatus which can smoothly be operated without vibration and noise when a multicolor image is formed on a recording medium by switching developing units with respect to a photosensitive member by using a switch means.

A further object of the present invention is to provide an image forming apparatus which can surely supply voltage to developing units.

A still further object of the present invention is to provide an image forming apparatus comprising a photosensitive member, a support portion for detachably supporting a developing unit for developing a latent image formed on the photosensitive member, the support portion supporting the developing unit in a pivotable manner, and a driving force transmitting portion disposed on an axis substantially the same as a pivot axis of the developing unit to transmit a driving force to the developing unit supported by the support portion.

The other object and features of the present invention will be apparent from the following detailed explanation of the invention.

DETAILED DESCRIPTION OF THE PREFERRED EMBODIMENTS

The present invention will now be explained in connection with embodiments thereof with reference to the accompanying drawings. In the following explanation, a "longitudinal direction" means an axial direction of a developing sleeve, a photosensitive drum, a carcel and the like, respectively.

(First Embodiment)

Figure 18:
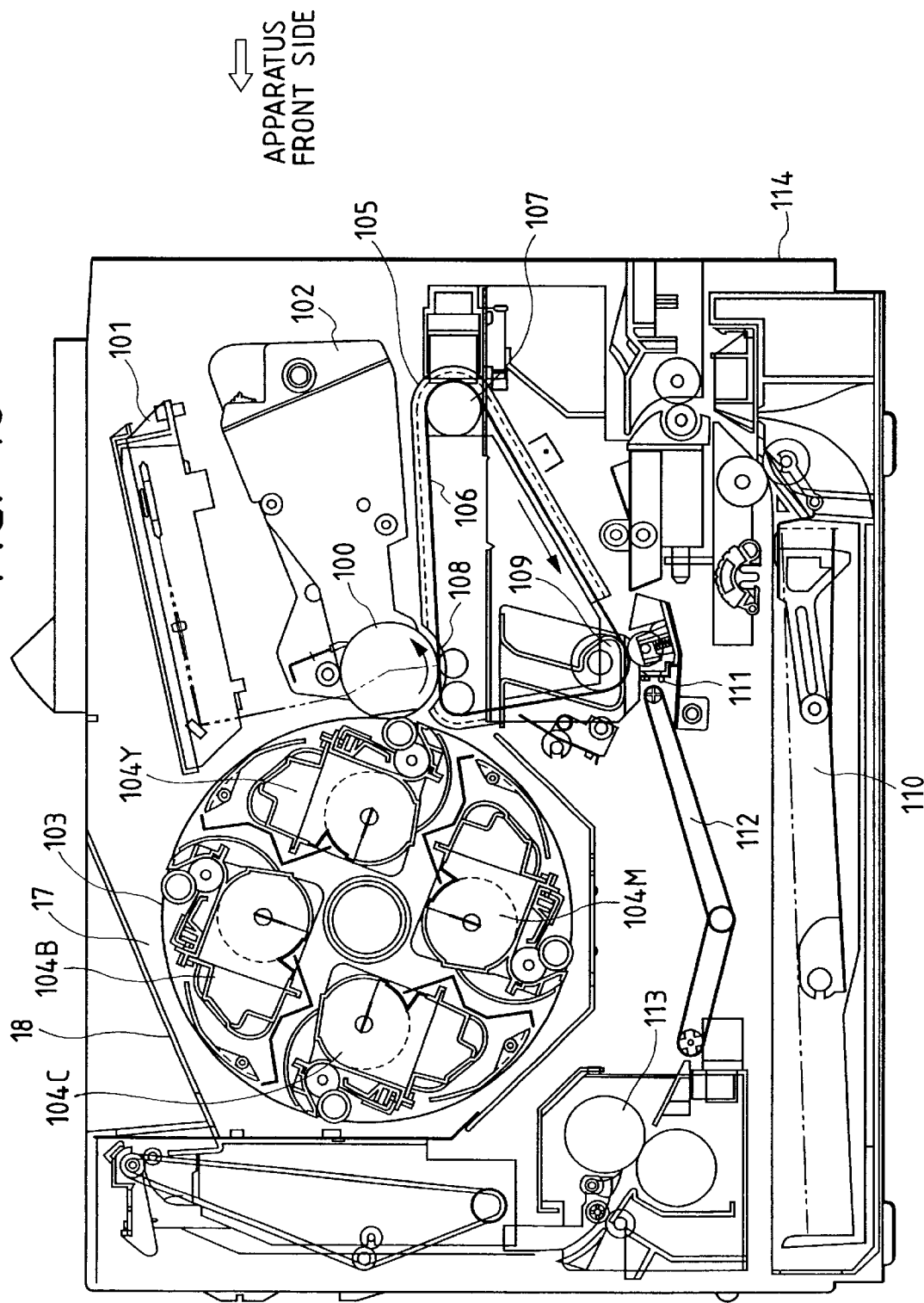
FIG. 18 is an elevational sectional view of an image forming apparatus.

FIG. 18 shows an entire electrophotographic image forming apparatus as an example of an image forming apparatus. A latent image is formed on a drum-shaped photosensitive image bearing member (photosensitive member) 100 provided in a process cartridge 102 by means of an optical unit 101. The latent image is developed by a developing cartridge (developing unit) 104Y rotatingly shifted to a developing station (where the developing cartridge is opposed to the image bearing member 100) by means of a carcel (developing cartridge switching means) 103. The developed image on the image bearing member 100 is transferred onto an intermediate transfer belt 106 of an intermediate transfer unit 105 at a first transfer portion 108. The intermediate transfer belt 106 is driven by a drive source within a main body 114 of the apparatus via a drive roller 107 disposed within the intermediate transfer unit 105. The above processes (latent image formation, latent image development and firstly-transferring) are repeated regarding developing cartridges 104M, 104C and 104B, thereby forming multicolor (toner) images on the intermediate transfer belt 106.

A recording medium is supplied from a sheet supply cassette 110, and then, the images on the intermediate transfer belt 106 are transferred onto the recording medium. In this case, a second transfer roller 111 is urged against the intermediate transfer belt 106 in a secondary-transferring process. The recording medium to which the images were transferred is sent, by a convey portion 112, to a fixing unit 113 to fix the images to the recording medium. Thereafter, the recording medium is discharged out of the apparatus. Incidentally, a paper sheet or an OHP sheet may be used as the recording medium.

FIGS. 1 to 4 show the developing cartridge (developing unit) 104. The developing cartridge 104 comprises a developing sleeve (developer bearing member) 407, a developing blade 411, a developer containing portion 408 and a developer agitating member 412, and further includes a coating roller 403 except the black cartridge 104B. The developing sleeve 407, developer agitating member 412 and coating roller 403 are driven by a drive source of the main body 114. At both ends of the developing cartridge 104, pivot (rock) center members 401, 402 are provided to extend in parallel with the developing sleeve 407 and to protrude from a frame of the developing cartridge 104. Further, in a condition that the developing cartridge 104 is not mounted to the main body 114, the developing sleeve 407 is covered by a shutter cover 405, and, in a condition that the developing cartridge 104 is mounted to the main body 114, the cover 405 is opened. Incidentally, the cover 405 is fitted on centers of the pivot center members 401, 402 so that the cover is supported for rotation around the pivot center members 401, 402. A driven connection member 410 capable of engaging with a drive connection member (described later) of the main body 114 is provided at the center of the pivot center members 401. Further, a contact portion 409 for applying developing bias from a high voltage source of the main body 114 to the developing sleeve 407 is arranged substantially flush with a longitudinal end face of the cartridge frame of the developing cartridge 104.

Figure 1:
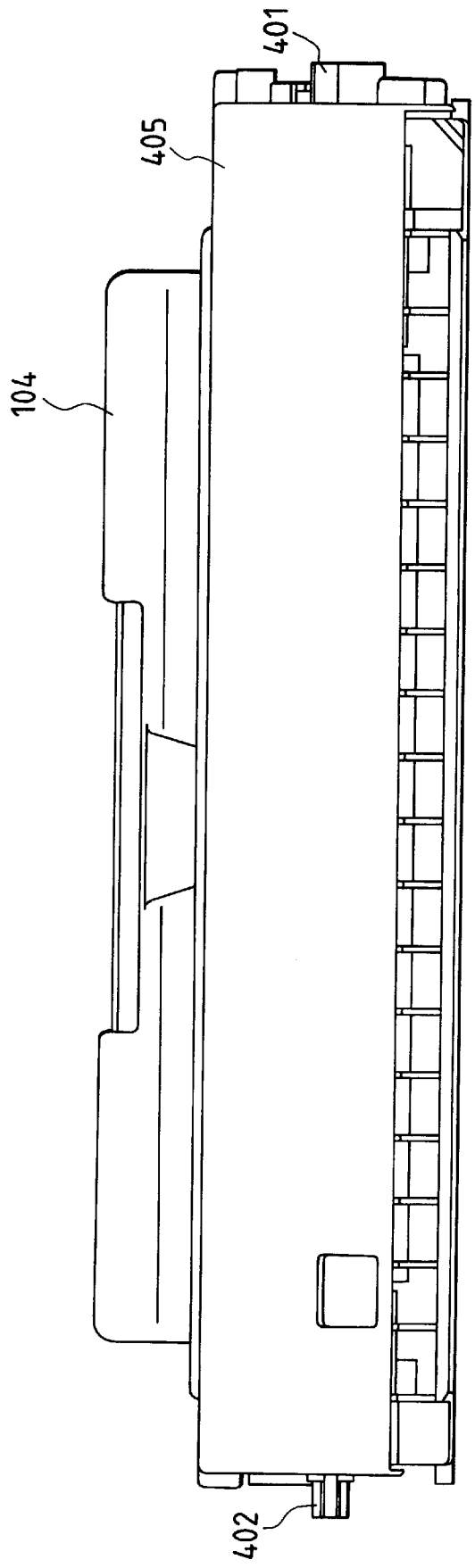
FIG. 1 is a plan view of a developing cartridge.
Figure 2:
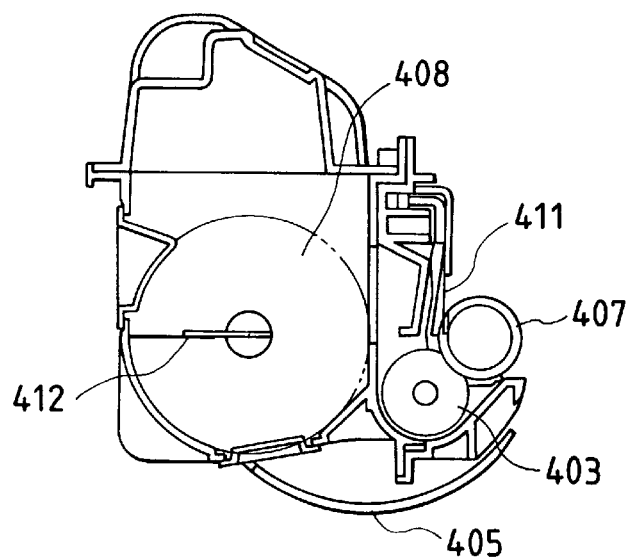
FIG. 2 is a sectional view of the developing cartridge.
Figure 3:
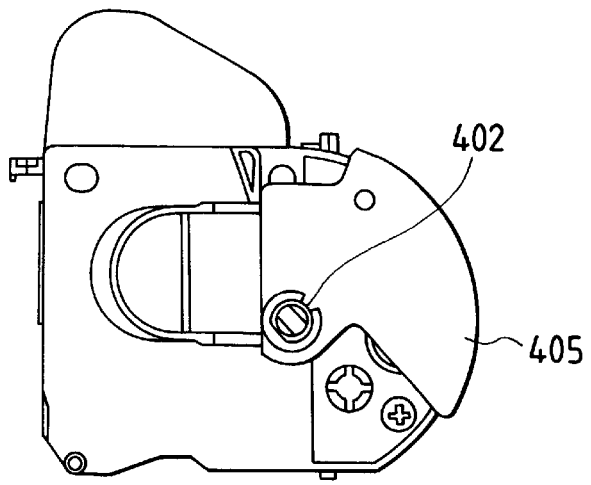
FIG. 3 is a left side view of the developing cartridge.
Figure 4:
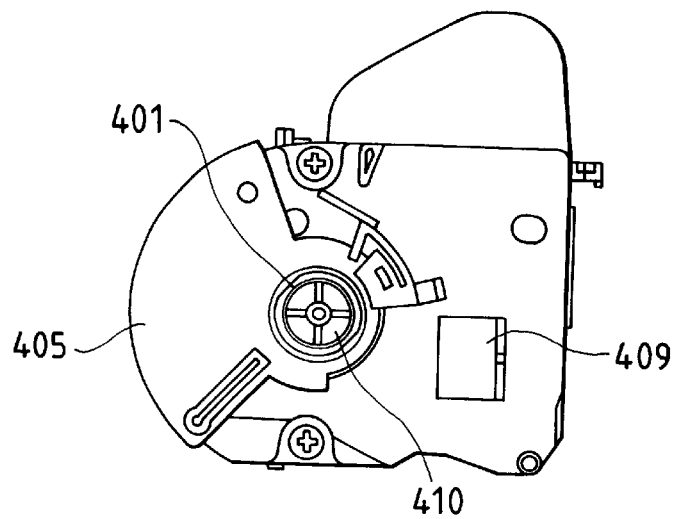
FIG. 4 is a right side view of the developing cartridge.
Figure 5:
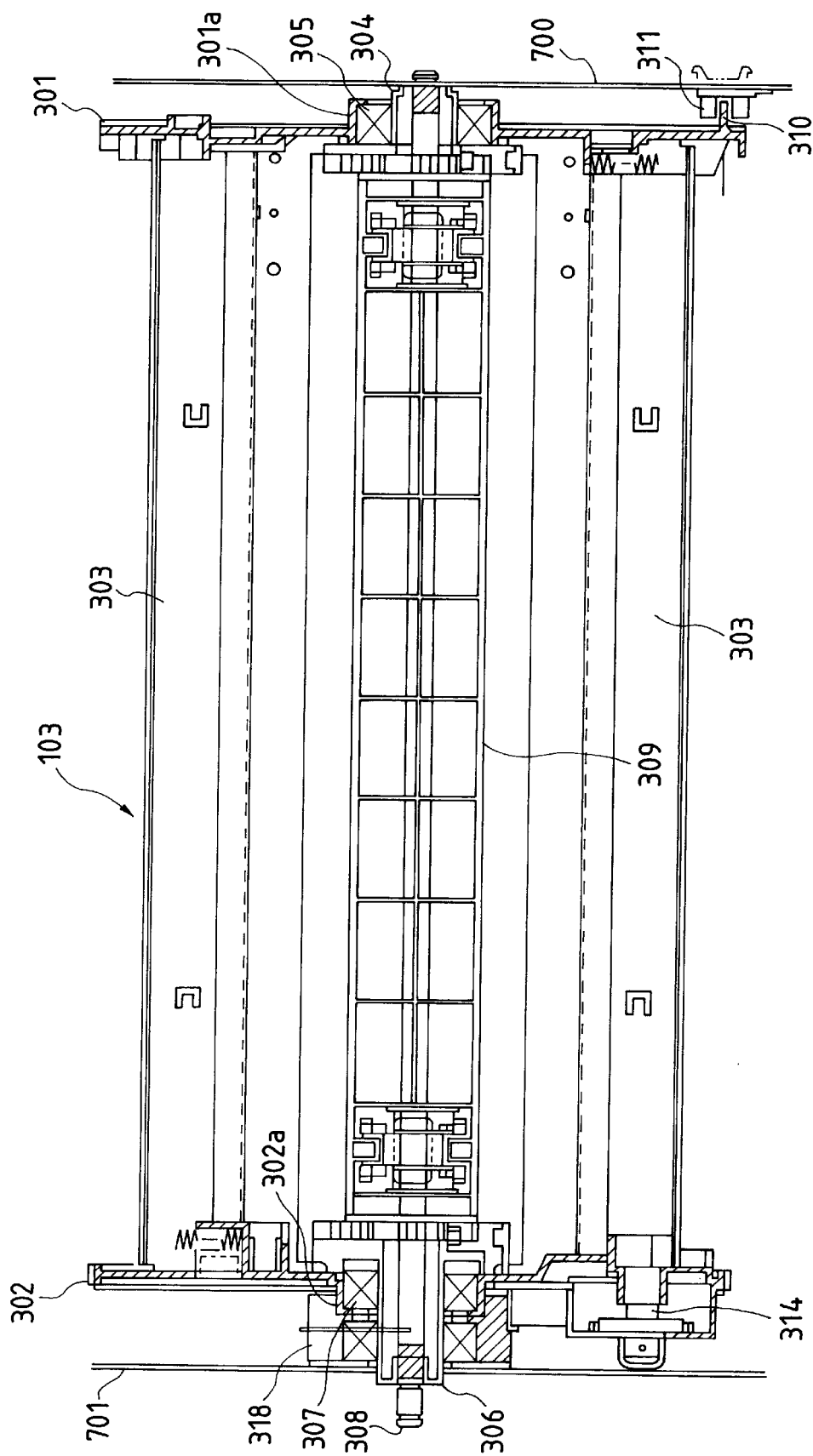
FIG. 5 is a plan view of a carcel (developing cartridge switching means)

FIG. 5 shows the carcel 103. The carcel 103 comprises a disc side plate 301, a drive side plate 302, and four stays 303 for connecting between the side plates 301, 302 at quarter positions in a circumferential direction and serving as a partition wall for a mounting portion for the developing cartridge 104. At a rotation center portion, there are disposed bearings 304, 306 secured to stays 700, 701 of the main body, respectively, a center stay unit 309 secured between the bearings 304 and 306, and a center shaft 308 fitted in the bearings 304, 306 and the center stay unit 309 at the centers of the bearings 304, 306 and the center stay unit 309. Ball bearings 305, 307 having inner races fitted on the bearings 304, 306 and outer races fitted in bearing housings 301a, 302a secured to the side plates 301, 302 are provided between the bearings 304, 306 and the side plates 301, 302. (Four) flags 310 corresponding to toner colors in the developing cartridges 104 are provided at a side face of the side plate 301 to pass across a photosensor 311 provided on the stay 700 of the main body by revolving the carcel 103. The photosensor 311 is a revolution sensor for detecting a revolving position of the carcel 103.

Figure 6:
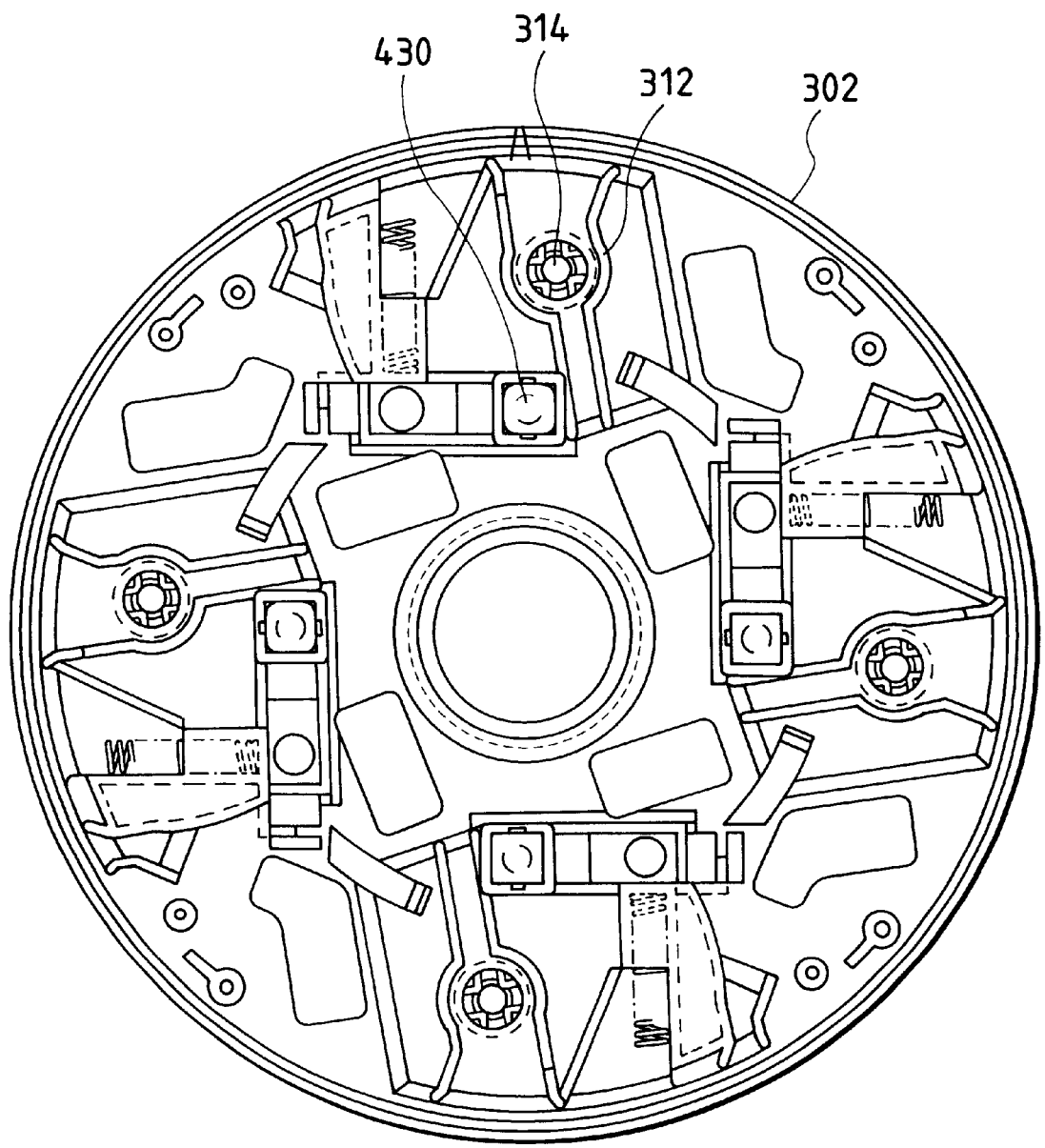
FIG. 6 is a side view of one end of the carcel looked at from inside.
Figure 7:
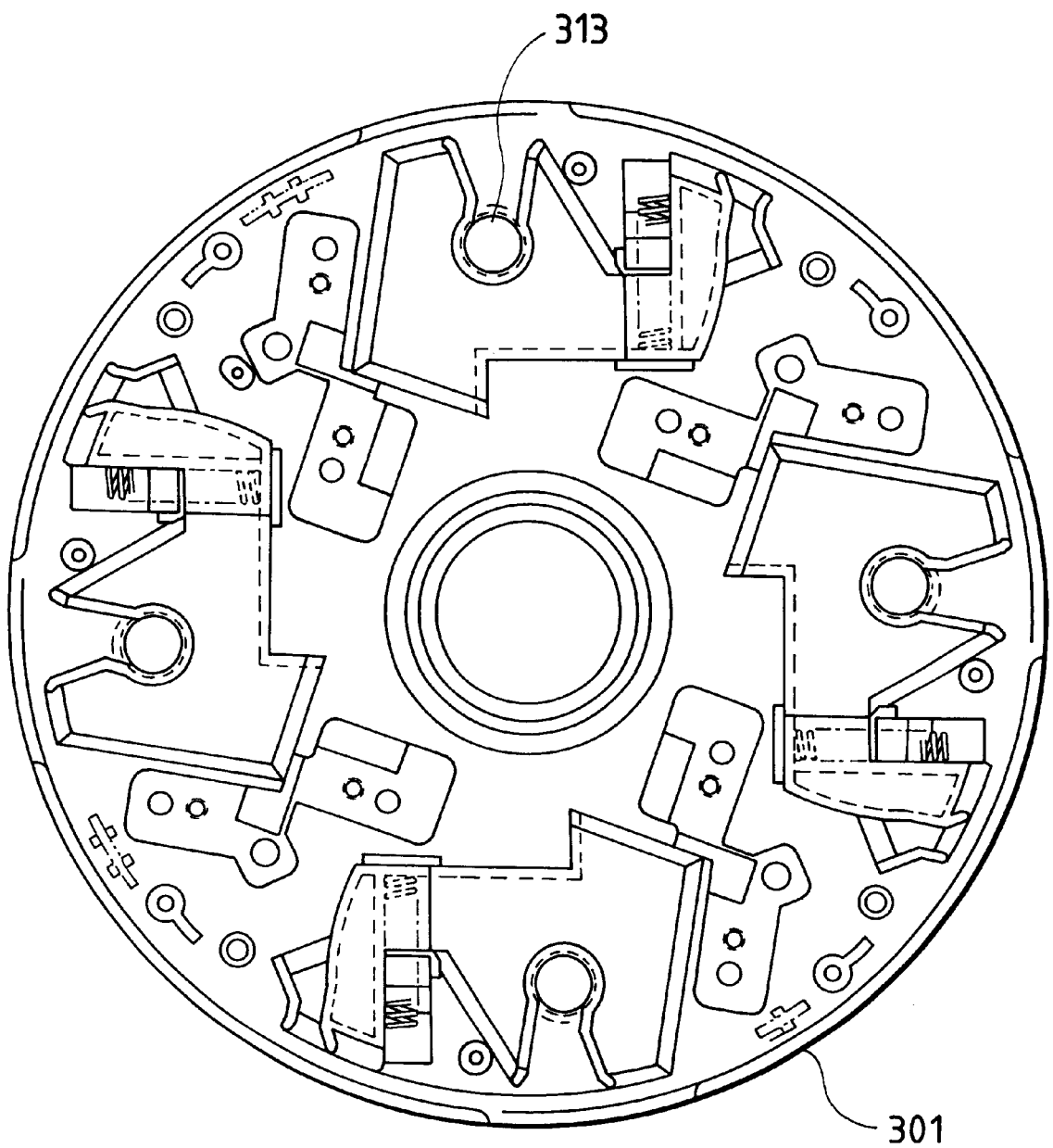
FIG. 7 is a side view of the other end of the carcel looked at from inside.

FIGS. 6 and 7 show developing cartridge (104) mounting sides of the side plate 301 and the drive side plate 302. The pivot center members 401, 402 of each developing cartridge 104 are rotatably supported by holding portions (support portions) 312, 313 of the side plates 301, 302. A drive connection member (driving force transmitting portion) 314 having a shaft coupling which can be engaged by and disengaged from the driven connection member 410 of the developing cartridge 104 is provided at the center of the holding portion 312 of the drive side plate 302, and a slide contact member (apparatus side contact) 430 which can be contacted with a contact (unit side contact) 409 of the developing cartridge 104 is provided on the side plate 302 near the center more than the holding portion 312. The drive connection member 314 and the drive connection member (driven force transmitting member) 410 have shaft couplings 314a, 410a comprised of recess and projection which have criss-cross shape looked at from the axial direction and which can be engaged by and disengaged from each other (see FIG. 11).

Figure 8:
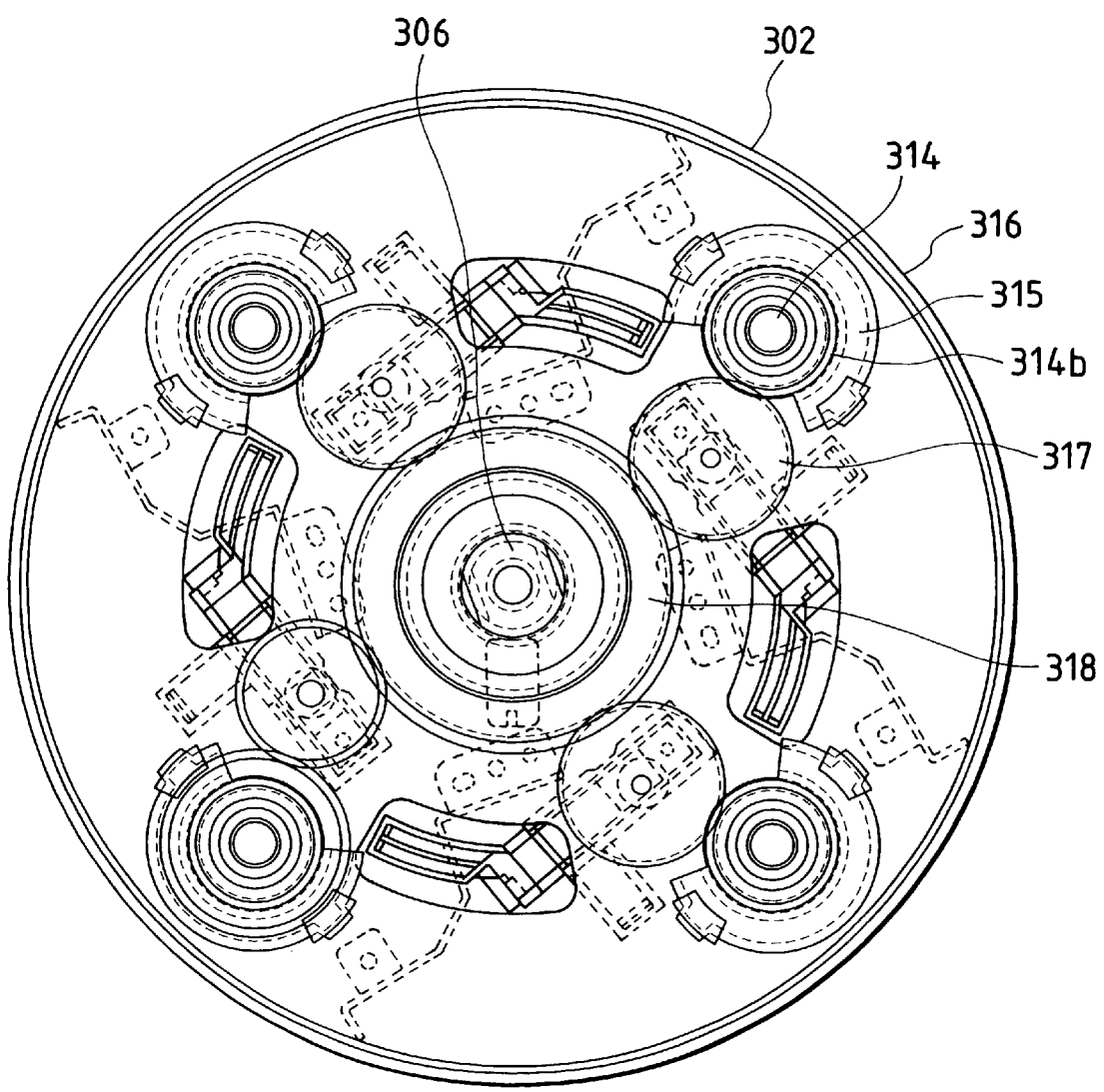
FIG. 8 is a side view of a drive portion for the carcel.

FIG. 8 is a view showing the drive side plate 302 looked at from a side of the stay 701 of the main frame (i.e., from outside). The drive connection member 314 has one end held by a holding member 315 secured to the drive side plate 302 and the other end held by a bearing 302c (FIG. 9) integral with the drive side plate 302 for sliding movement in a longitudinal direction.

Figure 9:
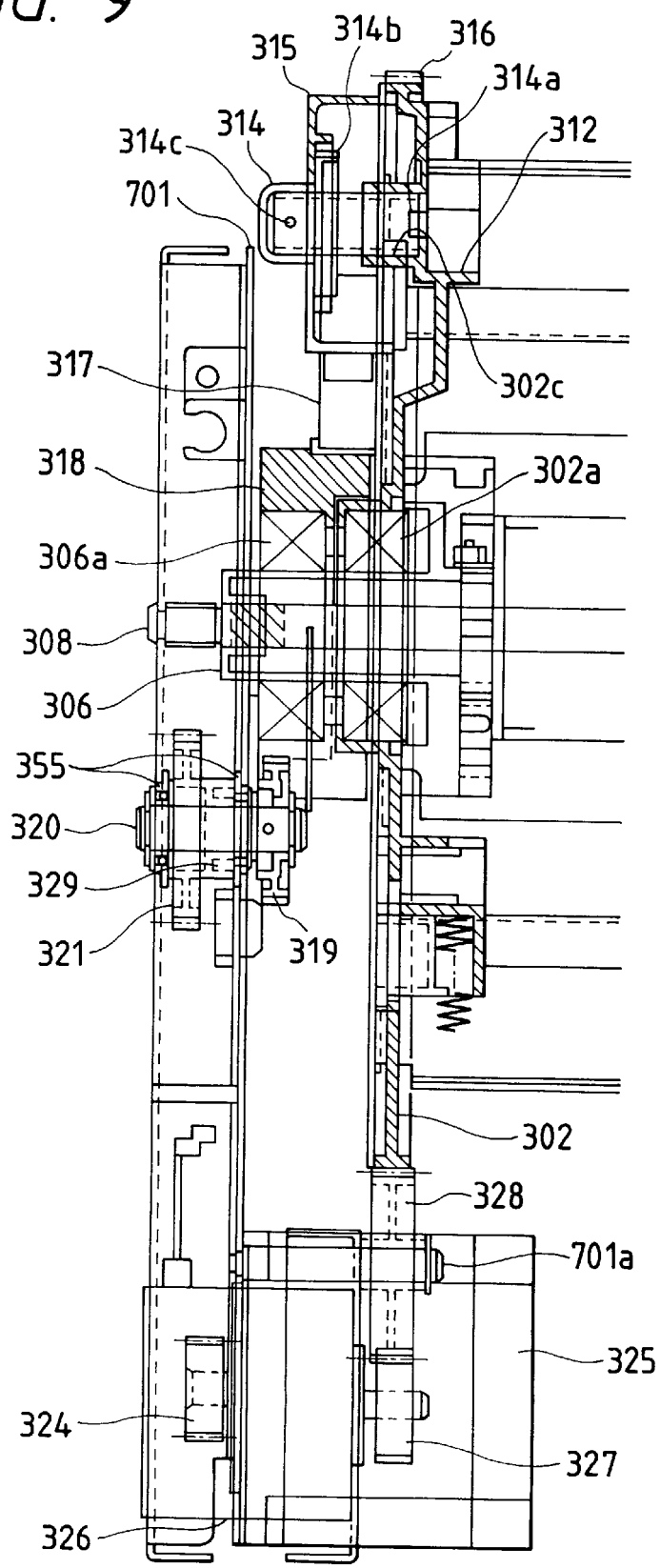
FIG. 9 is a plan view, in partial section, of a drive system for driving the developing cartridge.

As shown in FIG. 9, the drive connection member 314 is secured to a shaft provided at its one end with a shaft coupling 314a by fitting a capped gear 314b onto the other end of the shaft and by securing the gear by means of a screw 314c. The gear 314b is meshed with a gear 318 supported by the bearing 306 of the rotation center portion via a ball bearing 306a, through a gear 317 meshed with the gear 314b.

Figure 10:
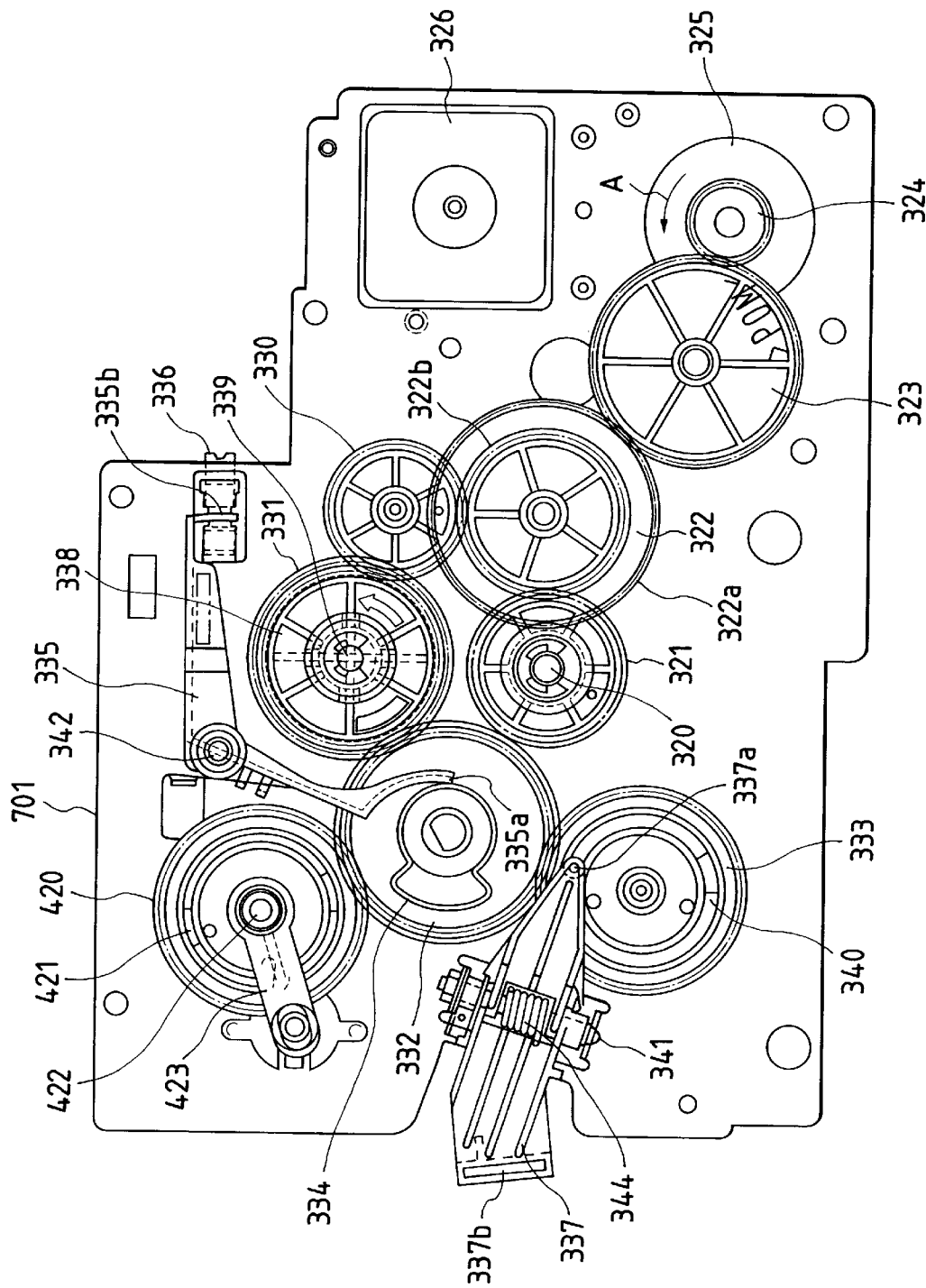
FIG. 10 is a side view of main body of an apparatus, for explaining a develop drive connection releasing mechanism and a develop contact abut releasing mechanism according to a first embodiment of the present invention.

In FIGS. 9 and 10, the gear 318 supported by the bearing 306 of the rotation center portion supporting the carcel 103 receives a driving force from a gear of a develop motor 325 connected to the gear 318 via gears 319, 321, 322 and 323. The gear 319 is secured to a shaft 320 rotatably supported by the bearing secured to the stay 701 of the main body and is rotated integrally with the shaft 320. A one-way clutch 329 is disposed between the gear 321 and the shaft 320 so that only one-way rotation (direction opposite to a direction A in FIG. 10; and so on) of the develop motor 325 is transmitted to the shaft 320. The gear 322 is a stepped gear including a large diameter gear 322a and a small diameter gear 322b and is rotatably supported by the stay 701 of the main body. The large diameter gear 322a is meshed with the gear 323 rotatably supported by the stay 701 of the main body, and the small diameter gear 322b is meshed with the gear 321. The center of the drive side plate 302 of the carcel 103 is supported via the ball bearing 306a fitted in the bearing 306 and is provided at its periphery with a gear 316.

A revolve motor 326 is secured to the stay 701 of the main body. A motor gear 327 secured to a motor shaft of the revolve motor 326 is connected to the gear through a gear 328 rotatably supported by a fixed shaft 701a secured to the body stay 701, so that a rotation switching operation (revolution) of the developing cartridges 104 of the carcel 103 can be effected.

Now, a develop drive connection releasing mechanism will be explained with FIG. 10. The rotation of the develop motor 325 is transmitted to a gear 338 through the gears 324, 323, the large diameter gear 322a of the gear 322 and a gear 330 meshed with the small diameter gear 332b of the gear 322. The gears 330, 338 are rotatably supported by the body stay 701. The gear 338 serves to transmit a driving force to a gear 331 on a shaft 339 via the shaft 339 which is rotatably supported by the body stay 701 and to which the gear 338 is secured. A one-way clutch (one-way rotation connection member) is provided between the gear 331 and the shaft 339 so that only the other direction rotation (direction A in FIG. 10) of the develop motor 325 is transmitted. The driving force is transmitted to a cam gear 333 integrally having a cam 340 and rotatably supported by the body stay 701 and meshed with a cam gear 332, which gear 332 is meshed with the gear 331 and is rotatably supported by the body stay 701 and integrally has a cam portion 334.

The cam gear 333 is provided at its periphery with the end face cam 340 having unevenness (convex and concave portions) extending in a direction perpendicular to the plane of FIG. 10, and the cam 340 is engaged by a cam follower 337a provided at a free end of a lever unit 337 which is fitted on a shaft 341 for rotation around the shaft 341. A torsion coil spring 344 for urging the cam follower 337a against the cam 340 is inserted onto the shaft 341. The torsion coil spring 344 is supported by the body stay 701 in parallel with a plate face of the flat body stay 701. The plate cam 334 is formed on the cam gear 332, and a sensor lever 335 provided at its one end with a cam follower 335a engaged by the cam 334 is rotatably supported by a rotation center shaft 342 secured to the body stay 701 for rotation around the rotation center shaft 342 and is biased by a spring (not shown) in an counter-clockwise direction in FIG. 10. When the develop drive connection is effected, a light shield member 335b provided at the other end of the lever 335 blocks light to a develop sensor 336 comprised of a photoelectric sensor secured to the body stay 701, and, when the develop drive connection is released, the light shield member does not block the light to the develop sensor 336. In the above-mentioned arrangement, for example, stepping motors capable of controlling a rotational angle are used as the develop motor 325 and the revolve motor 326.

Next, a develop drive connection releasing operation effected by the lever unit 337 will be explained with reference to FIGS. 11 and 12. A dog 337b as an operation member (abut member) for the drive connection member 314 is provided at the other end of the lever unit 337.

Figure 11:
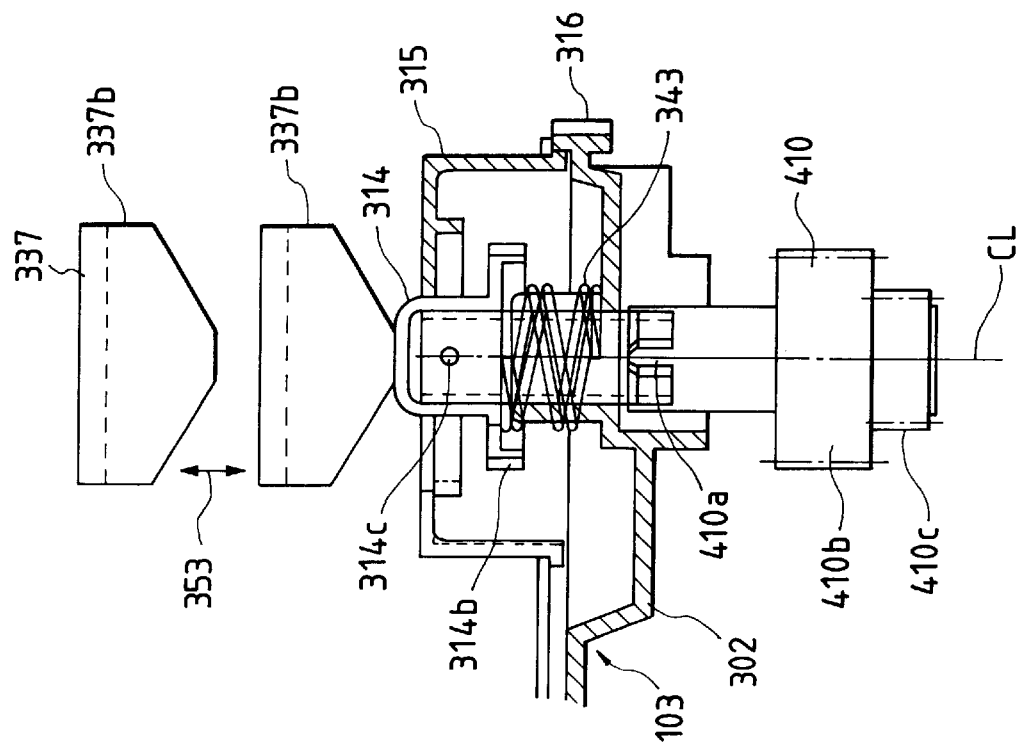
FIG. 11 is a plan view of the carcel looked at from a radial direction, showing connection of a drive connection member of the drive connection releasing mechanism.
Figure 12:
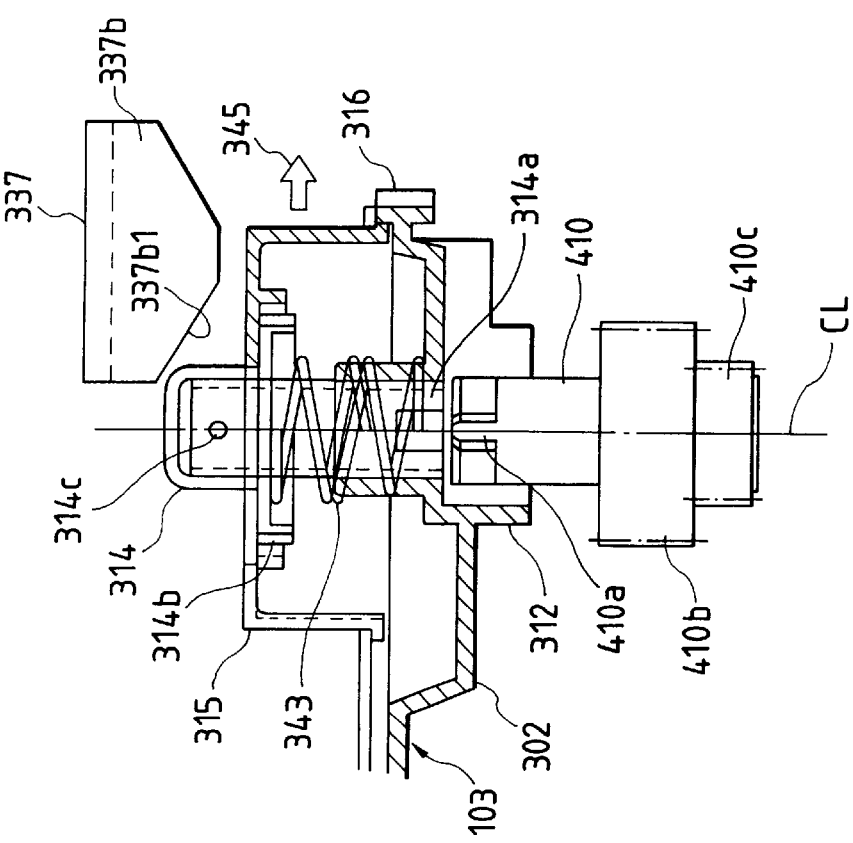
FIG. 12 is a plan view of the carcel looked at from a radial direction, showing connection of a develop drive connection member of the drive connection releasing mechanism.

In a condition that the development is not effected, as shown in FIG. 11, the drive connection member 314 having the shaft coupling 314a is spaced apart from the shaft coupling 410a of the driven connection member 410 by a spring force of a compression coil spring 343 inserted (onto the drive connection member 314) and compressed between the side plate 302 and the gear 314. When the lever unit 337 is brought to the develop drive connection condition and the entire carcel 103 is revolved in a direction shown by the arrow 345 in FIG. 11, the drive connection member 314 is pushed by a cam surface 337b1 of the dog 337b of the lever unit 337 to be shifted in an axial direction in opposition to the spring force of the compression coil spring 343. As a result, the shaft coupling 314a of the drive connection member 314 is connected to the shaft coupling 410a provided at one end of the driven connection member 410, with the result that the carcel 103 is stopped in a condition that a tip end of the dog 337b is engaged by the cap of the drive connection member 314. After the development, when the lever unit 337 is retarded toward a direction shown by the arrow 353, the drive connection member 314 is retarded by the spring force of the compression coil spring 343, to release the connection between the shaft couplings 314a and 410a. Incidentally, it is possible that, after the carcel 103 is firstly revolved and then is stopped, the lever unit 337 is operated to shift the dog 337b in the direction 353 in FIG. 12 to interconnect the shaft couplings 314a and 410a.

Figure 13:
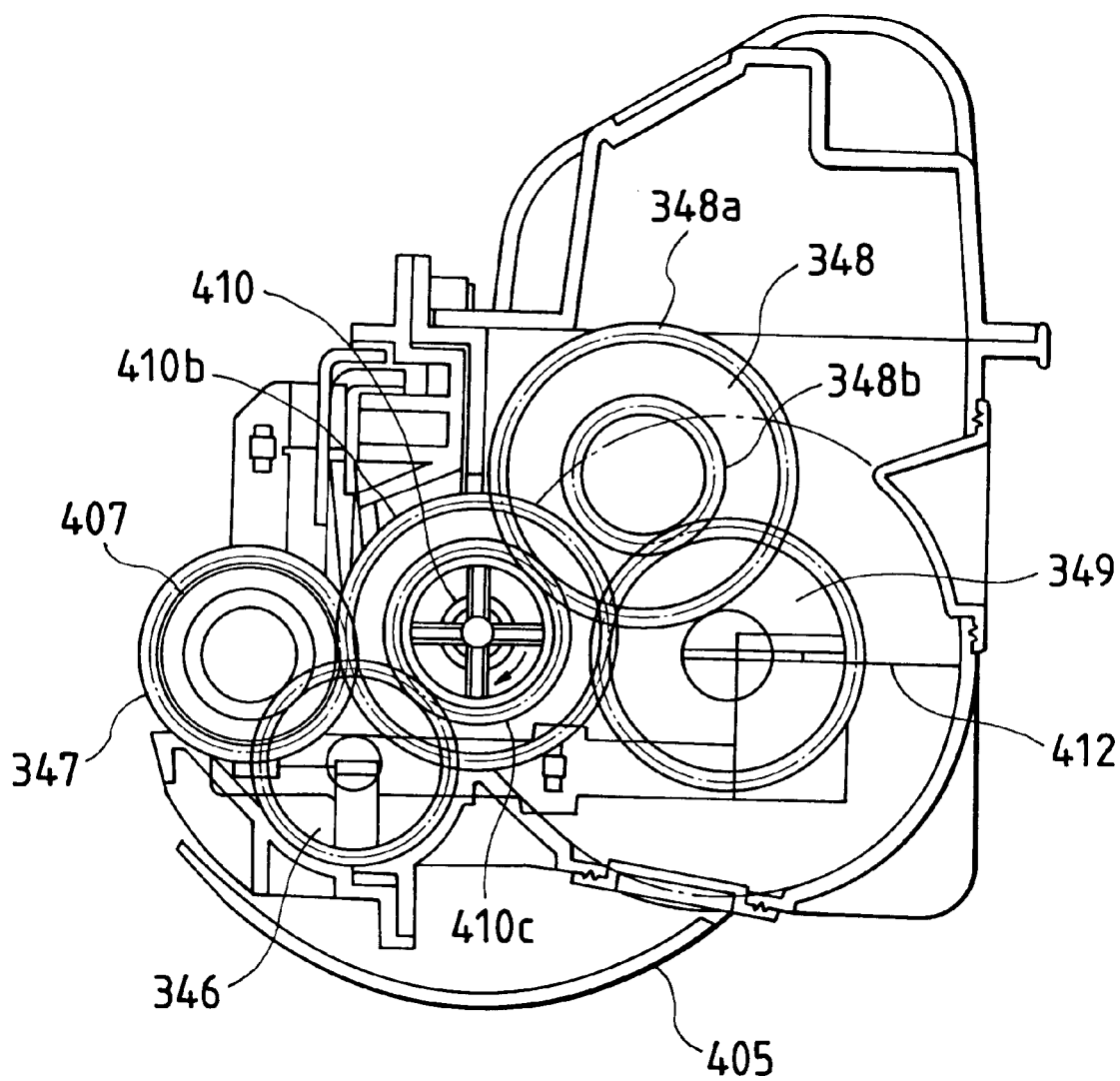
FIG. 13 is a side view showing a gear train in the developing cartridge.
Figure 14:
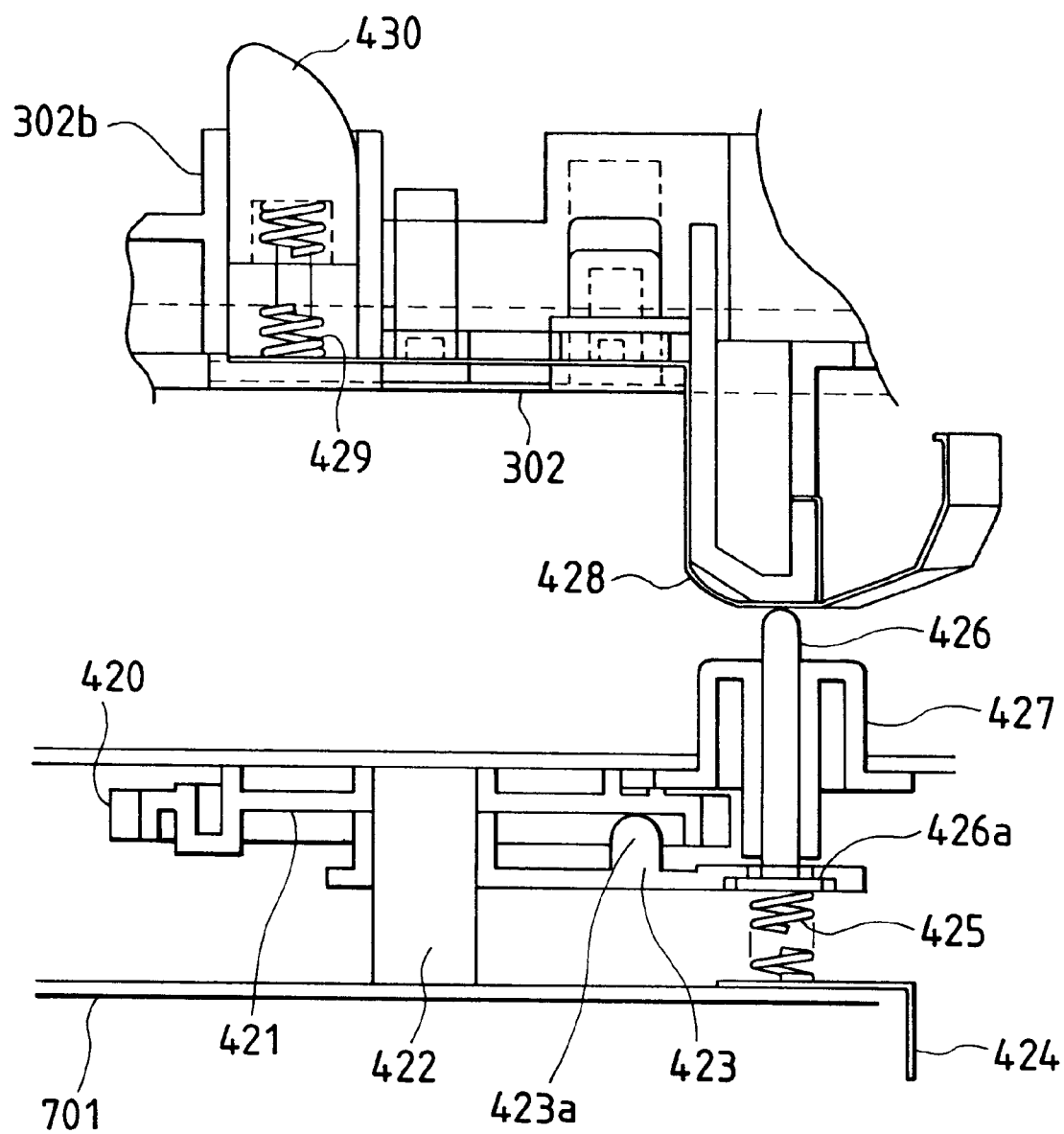
FIGS. 14 and 15 are plan views of the develop contact abut releasing mechanism.

The drive gear train in the developing cartridge 104 shown in FIG. 13 is provided at one longitudinal end of the developing cartridge 104 and is rotatably supported. The driving force inputted to the driven connection member 410 is transmitted to a gear 347 coaxially secured to the developing sleeve 407 and meshed with a large diameter gear 410a of the driven connection member 410 and is also transmitted to a large diameter gear 348a of a stepped gear 348 meshed with a small diameter gear 410c of the driven connection member 410, thereby rotating the stepped gear 348. With this arrangement, the driving force is transmitted to a gear 349 (coaxial and integral with the developer agitating member 412) meshed with a small diameter gear 348b of the stepped gear 348.

Further, in the developing cartridges 104M, 104C and 104Y except the black developing cartridge 104B, a gear 346 secured to the coating roller 402 is meshed with the small diameter gear 410c of the driven connection member 410.

In the above-mentioned arrangement, as shown in FIG. 13, the driven connection member 410 receives a driving force in a clockwise direction shown by the arrow. Since the center of the image bearing member 100 (not shown in FIG. 13) is positioned above an extension of a line connecting between the driven connection member 410 and the developing sleeve 407 in FIG. 13, the developing sleeve 407 is rotated around the pivot center members 401, 402 in a same direction as the rotational direction of the driven connection member 410 to be urged against the image bearing member 100. The urging force acts in a wedge fashion.

Next, a develop contact abut releasing mechanism will be explained with reference to FIGS. 6, 10, 14 and 15. A cam gear 420 is engaged by the cam gear 332 driven by the develop motor 325, and an end face cam portion 421 is formed on the cam gear 420. The cam gear 420 is rotatably fitted onto a shaft 422 secured to the body stay 701. A release member 423 is fitted on the shaft 422 provided at the center of the cam gear 420 for sliding movement in an axial direction, and a cam follower (projection) 423a provided on the release member 423 is urged against. the cam 421 by receiving a spring force of a contact spring (compression coil spring) 425 provided and compressed between the body stay 701 and a contact pin 426 via a flange 426a of the contact pin 426 and is rotated in accordance with rotation of the cam gear 420. The developing bias is directed to a contact 424 from a high voltage power source of the main body 114 of the apparatus and is applied to the contact pin 426 through the contact spring 425. The contact pin 426 is guided by a guide bush 427 secured to the body stay 701 and can be shifted between an abut position where the contact pin abuts against a contact 428 of the developing cartridge switching mechanism, i.e., carcel and a release position, by the release member 423. At the abut position, the contact pin 426 is urged against the carcel contact 428, and the contact 428 is connected to a slide contact member 430 slidingly (in the axial direction) fitted in a guide portion 302b of the drive side plate 302 of the carcel 103 via a contact spring 429. The contact member 430 is urged against a contact portion 409 (FIG. 4) of the developing cartridge 104, and the contact portion 409 is connected to the developing sleeve 407 within the developing cartridge 104. With this arrangement, in synchronism with the develop drive connection releasing operation, the develop contact abut releasing operation is effected.

In this way, since the contact pin 426 is not slidingly contacted with the carcel contact 428, the service lives of the contacts are lengthened considerably, and, when the developing cartridge now not used in the development passes through the position of the image bearing member 100, since the contact pin 426 is not contacted with the carcel contact 428, the rotation of the carcel 103 can be effected smoothly.

Figure 16:
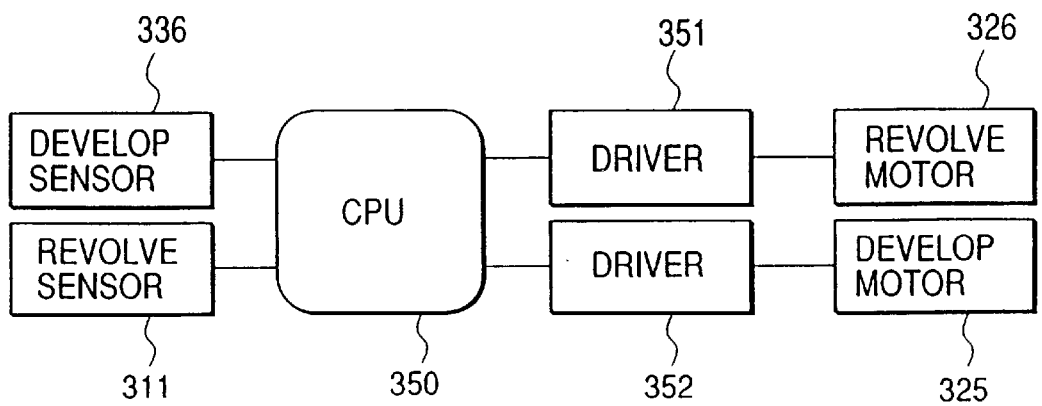
FIG. 16 is a control block diagram of the develop drive connection releasing mechanism.

Next, control regarding the develop drive connection releasing and the develop abut releasing will be explained with reference to FIG. 16 (control block diagram) and FIG. 17 (flowchart for explaining the operation in FIG. 16). In FIG. 16, when an active signal from the develop sensor 336 is inputted, a central calculation processing device (CPU) 350 rotates the revolve motor 326 through a driver 351. When an active signal from the revolve sensor (photosensor) 311 is inputted, the CPU 350 rotates the develop motor 325 through a driver 352. The CPU 350 has a program including an inhibiting circuit for emitting command for energizing only either the driver 351 or 352.

Figure 17:
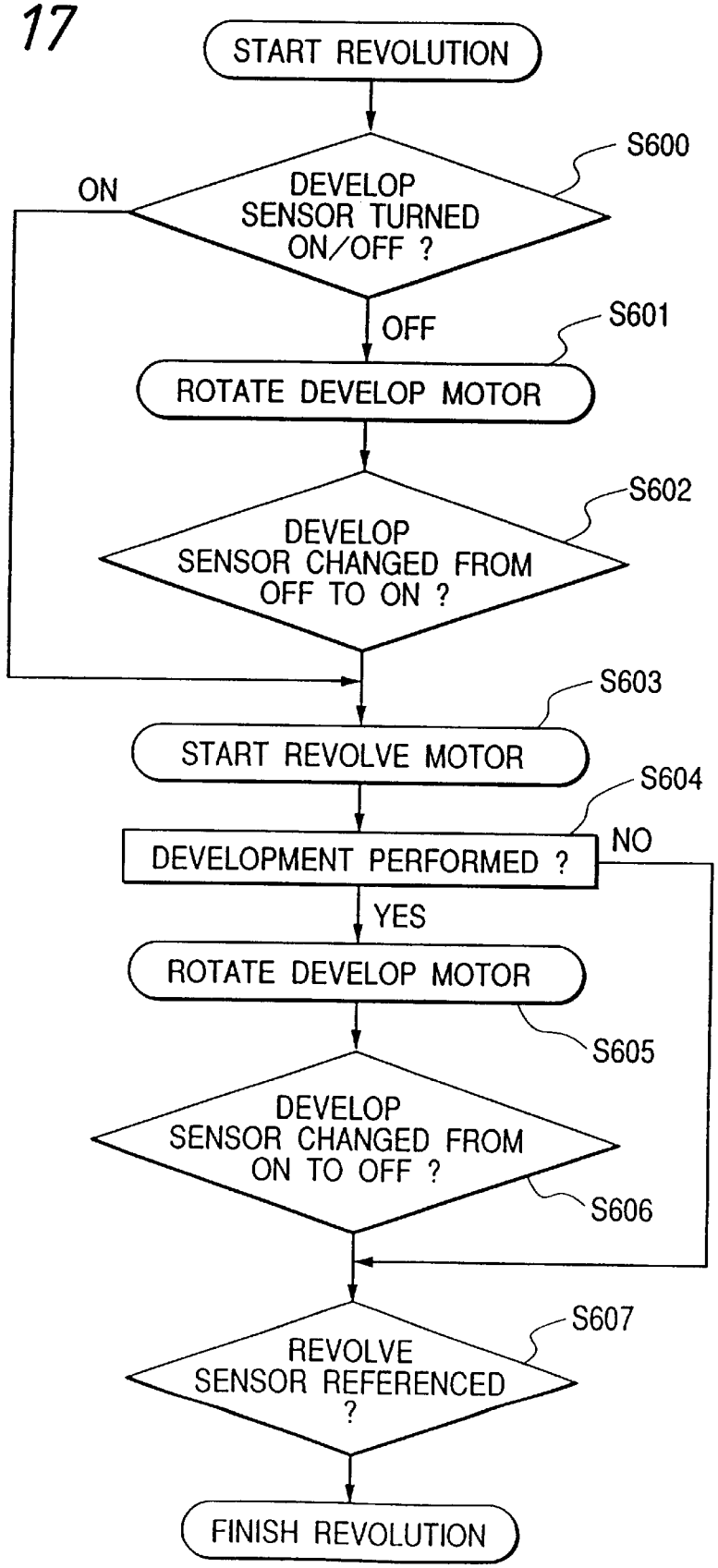
FIG. 17 is a flowchart for the develop drive connection releasing mechanism and the develop contact abut releasing mechanism.

In FIG. 17, when the revolution of the carcel 103 is effected, first of all, ON/OFF of the develop sensor 336 is ascertained in a step 600. When the develop sensor 336 is in an OFF condition, the drive connection member 314 is spaced apart from the driven connection member 410 in the circumferential direction of the carcel 103 or, if the centers of these members are aligned with each other, the shaft couplings 314a, 410a are not engaged by each other. In the step 600, if the develop sensor 336 is ON, the program goes to a step 603.

In the step 600, if the develop sensor 336 is OFF, the program goes to a step 601 to rotate the develop motor 325 in the direction A. Although this rotation is transmitted to the gears 324, 323, 322 and 321 and the shaft 320 (FIG. 10) successively, the gear 321 is rotated idly on the shaft 320 due to the presence of the one-way clutch disposed between the shaft 320 and the gear 321 rotatably supported by bearing 355 (FIG. 9) on the shaft 320, with the result that the gear 319 is not rotated. Accordingly, the drive connection member 314 of the carcel 103 is not rotated through the gears 319, 318, 317 and 314b. On the other hand, the rotation of the gear 322 is transmitted to the gears 330, 338 and the shaft 339, to rotate the gear 331 through the one-way clutch on the shaft 339. The gear 331 rotates the cam gear 332. The cam 334 rotated together with the cam gear 332 pushes the cam follower 335a (by its higher lift), with the result that the sensor lever 335 is rotated around the shaft 342 in an counter-clockwise direction (FIG. 10) to lift the light shield member 335b, thereby switching the develop sensor 336 from OFF to ON.

Incidentally, in this case, although the cam gear 332 transmits the rotation to the cam gear 333 to rotate the cam gear 333 and the cam 340, since the lift of the cam is zero, the cam follower 337a of the lever unit 337 is not pushed, and, thus, the lever unit 337 is not rocked around the shaft 341 in opposition to the spring force of the torsion coil spring 344, with the result that the dog 337b is spaced apart from the drive connection member 314 of the carcel 103.

Figure 15:
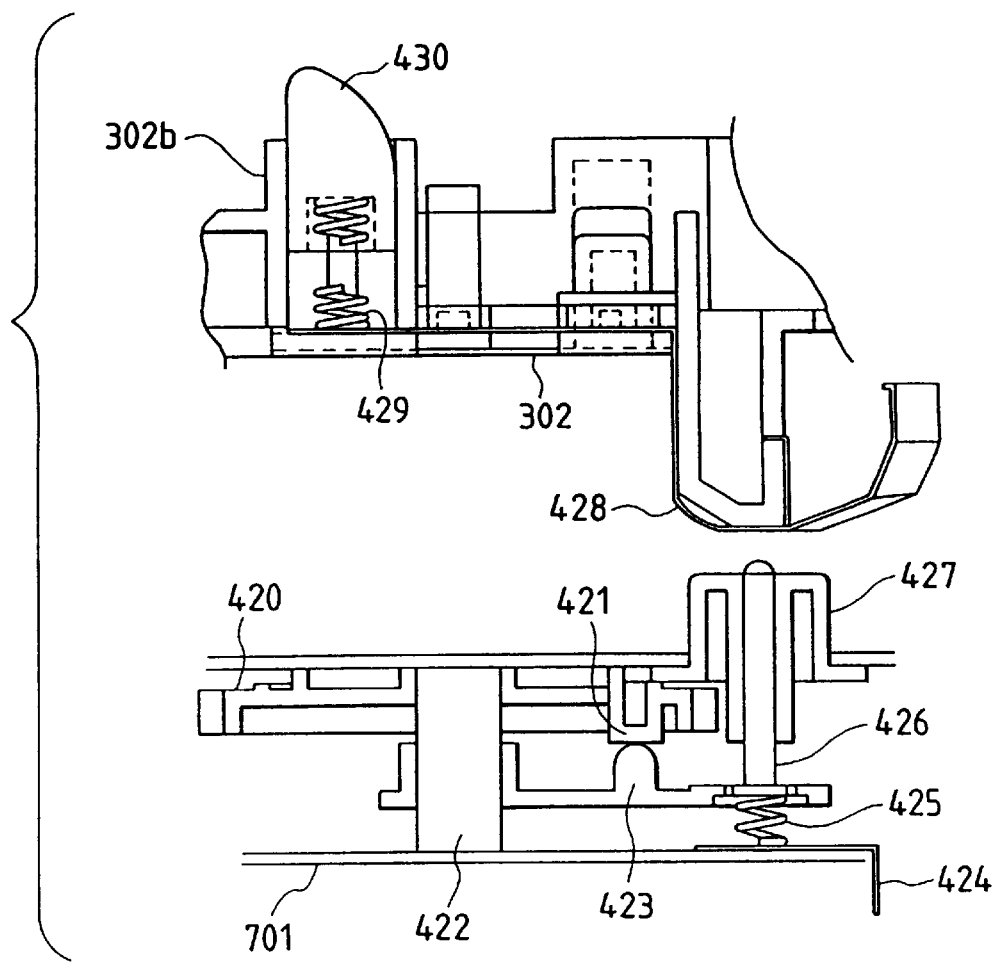

After the develop sensor 336 is switched from OFF to ON in a step 602, the develop motor 325 is rotated in the same direction by a predetermined angle and then is stopped. During the rotation through the predetermined angle, the rotation of the stepped gear 322 is transmitted to the cam gear 420, with the result that the end face cam 421 pushes the cam follower 423a (by its higher lift) to retard the release member 423 and the contact pin 426 in opposition to the spring force of the contact spring 425, thereby ensuring that the contact pin 426 cannot be contacted with the carcel contact 428 as shown in FIG. 15.

In the step 603, by turning the develop sensor 336 ON, the rotation of the revolve motor 326 is started. The rotation of the revolve motor 326 is transmitted to the gears 327, 328 and 316 successively, thereby rotating the carcel 103.

In a step 604, the developing cartridges 104 now not used in the development are passed through the image bearing member 100. In this case, the dog 337b is spaced apart from the drive connection member 314. Further, since the carcel contact 428 is spaced apart from the contact pin 426 of the main body 114, the carcel 103 is rotated without resistance, and the developing sleeve 407 passes through the image bearing member 100. However, even if the dog 337b remains in a position where the dog acts on the drive connection member 314 as shown in FIG. 11, since the cam surface 337b1 is inclined with respect to the shifting direction of the drive connection member 314, the operation can be effected. The program goes to a step 607 to rotate the revolve motor 326 by a predetermined angle on the basis of the signal from the revolve sensor (photosensor) 311 and then is stopped.

In the step 604, if the development is effected, the revolve motor 326 is stopped at the position where the developing sleeve 407 is opposed to the image bearing member 100, and the developing cartridge 104 is not moved. In a step 605, the develop motor 325 is rotated in the direction A by a predetermined angle so that the sensor lever 335 is rotated around the shaft 342 in the clockwise direction (FIG. 10) to shield the light path by the light shield member 335b, thereby turning the develop sensor from ON to OFF, and then the develop motor is stopped. By the rotation of the develop motor 325 by the predetermined angle in the direction A, the cam gear 333 is rotated, with the result that the cam 340 pushes the cam follower 337a to rock the lever unit 337 around the shaft 341 in opposition to the spring force of the torsion coil spring 344, thereby advancing the dog 337b. The dog 337b advances the drive connection member 314 of the carcel 103 in opposition to the spring force of the compression coil spring 343, thereby connecting the shaft coupling 314a of the carcel to the shaft coupling 410a of the developing cartridge 104. At the same time, by the rotation of the develop motor 325 by the predetermined angle in the direction A, since the cam follower 423a can be advanced to the position where the lift of the end face cam 421 is zero by the rotation transmitted from the gear 322 to the cam gear 420, the contact pin 426 which was retracted by the highest lift of the end face cam 412 and the release member 423 are pushed forwardly by the spring force of the contact spring 425, thereby urging the contact pin 426 against the carcel contact 428.

After the above operation, in the step 605, when the develop motor 325 is rotated in a direction opposite to the direction A, the rotation is transmitted to the gears 324, 323, 322 and 321, the shaft 320, the gears 319, 318, 317 and 314b successively, with the result that the drive connection member 314 and the driven connection member 410 are rotated to rotate the developing sleeve 407, thereby effecting the development.

In a step 606, when the development effected by the developing sleeve 407 is finished, the develop motor 325 is rotated reversely in the direction A, with the result that the develop sensor 336 is rotated by a predetermined angle to turn the sensor from ON to OFF and then is stopped. Consequently, the dog 337b of the lever unit 337 is separated from the drive connection member 314 of the carcel 103, and the drive connection member 314 is retarted from the driven connection member 410 of the developing cartridge 104 by the spring force of the compression coil spring 343 to separate the shaft couplings 314a, 410a from each other. At the same time, the cam gear 420 is rotated, with the result that the end face cam 421 retards the cam follower 323a to retard the release member 423 in opposition to the spring force of the contact spring 425, thereby separating the contact pin 426 from the carcel contact pin 428.

In a step 607, the revolve motor 326 is rotated by a predetermined angle on the basis of the signal from the revolve sensor 311 and then is stopped, thereby indexing the carcel 103.

According to the illustrated embodiment, in the condition that the developing cartridge is opposed to the image bearing member, the rotation of the developing sleeve for development, and engagement and disengagement of the drive connection member of the input portion for transmitting the driving force to the developing sleeve can be performed by the single motor through the developing cartridge switching mechanism. Further, at the same time, the engagement and disengagement between the contact of the carcel and the contact of the main body of the apparatus (connected to the developing high voltage power source) can be performed by the same motor. Since the developing sleeve 407 can pass through the image bearing member 100 in the condition that the drive connection member is spaced apart from the dog 337b and the contact pin 426 for applying the developing bias is spaced apart from the carcel contact 428, the developing cartridges 104 can be switched smoothly.

(Second Embodiment)

In a second embodiment of the present invention, there is provided a pivot pressurizing mechanism which will be described below. The second embodiment will now be explained with reference to FIGS. 19 to 24.

Figure 19:
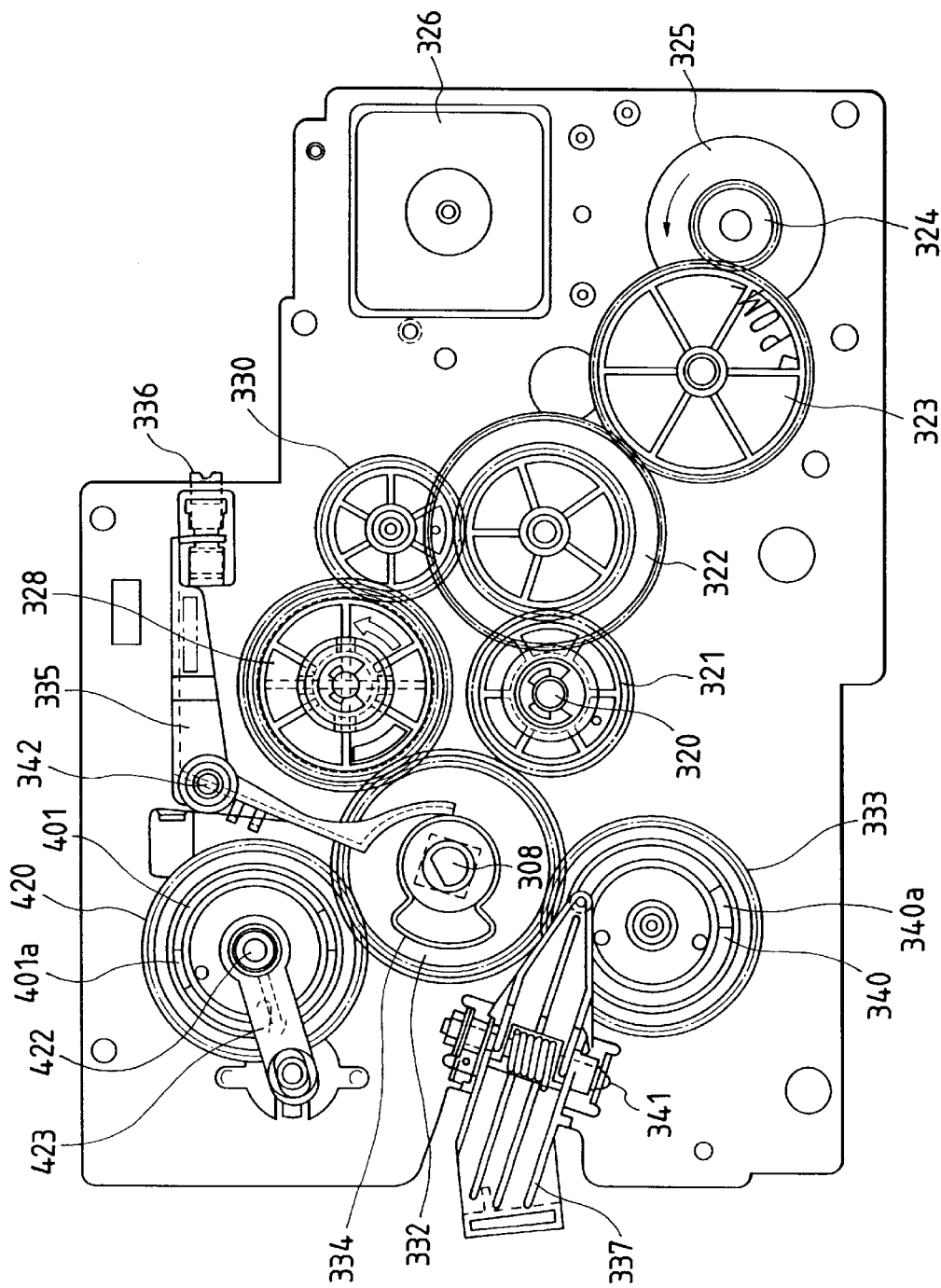
FIG. 19 is a side view of main body of an apparatus, for explaining a develop drive connection releasing mechanism and a develop contact abut releasing mechanism according to a second embodiment of the present invention.
Figure 23:
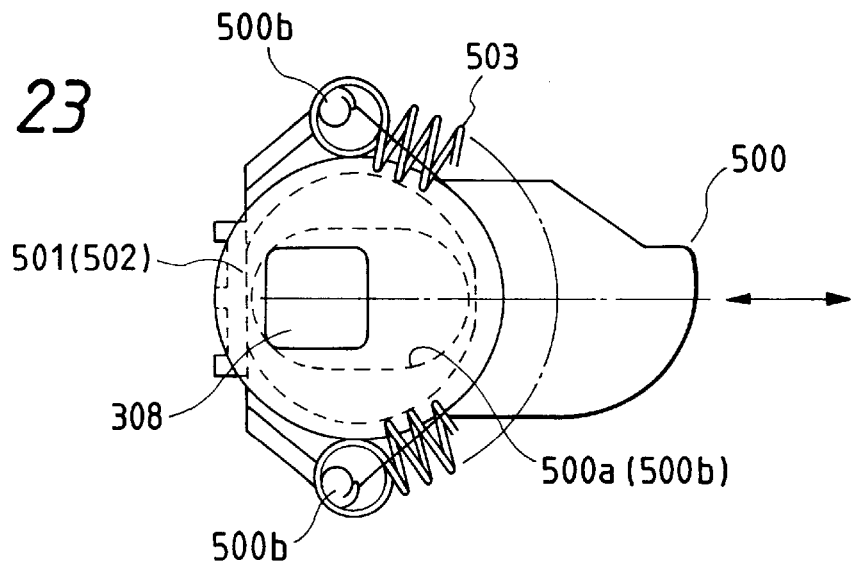
FIGS. 23 and 24 are side views of the pivot pressurizing mechanism of FIG. 22.

In FIG. 19, the driving force of the develop motor 325 is transmitted to the cam gear 332. The cam gear 332 is secured to the center shaft 308 provided at the center of the carcel 103 to be rotated integrally with the center shaft. Both end of the center shaft 308 are rotatably supported by the bearings 304, 306 secured to the stays 700, 701 of the main body. Two pressurizing mechanisms each comprising a pressure member 500, pressure cams 501, 502 and pressure springs 503 are provided within the center stay unit 309 secured to the bearings 304, 306. The pressure member 500 is fitted on a straight guide (not shown) of the center stay unit 309 for shifting movement in a direction shown by the arrow B in FIG. 21. The center shaft 308 extends through an elongated slot 500a (extending in the direction B) formed in the pressure member 500, so that the center shaft 308 does not interfere with the pressure member 500. The pressure cams 501, 502 are eccentric cams which are fitted on polygonal intermediate portions of the center shaft 308. As shown in FIG. 23, the pressure springs 503 having both ends connected to spring hooks 500b of the pressure member 500 surround the pressure cams 501, 502 by about half of revolution.

Figure 20:
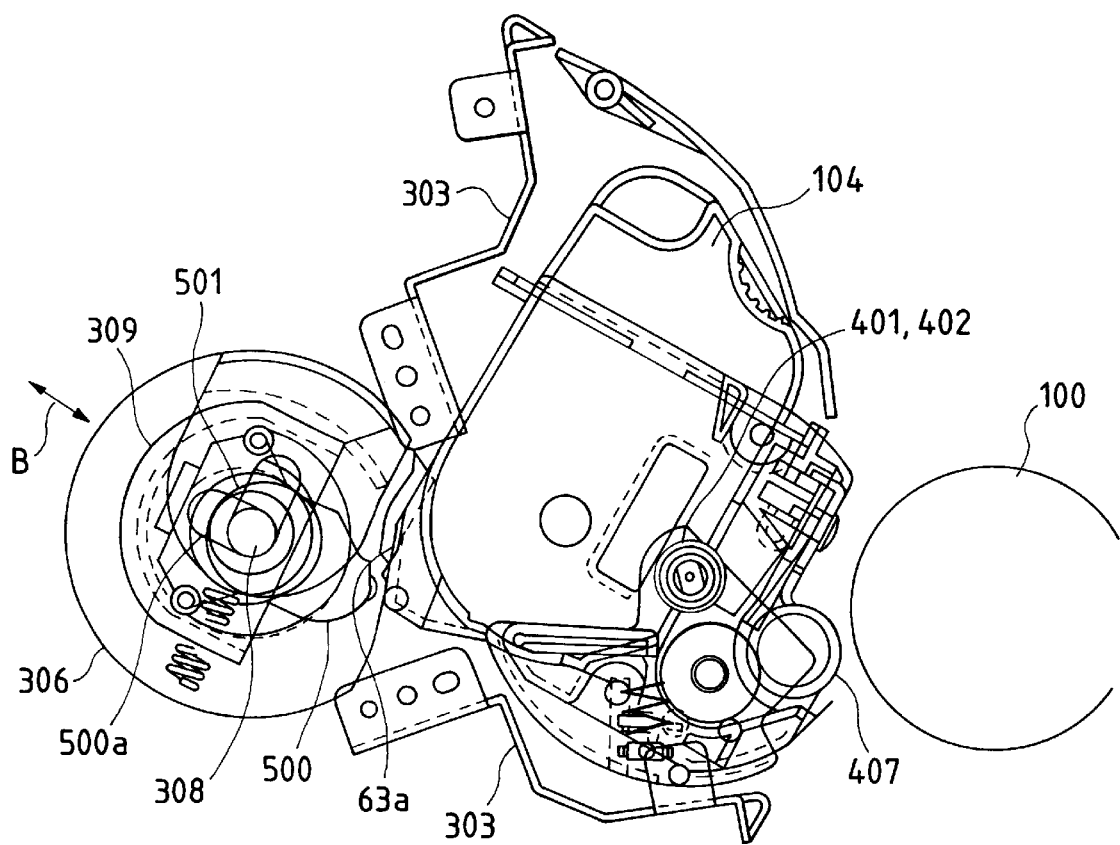
FIGS. 20 and 21 are sectional views of a pivot pressurizing mechanism according to the second embodiment.
Figure 21:
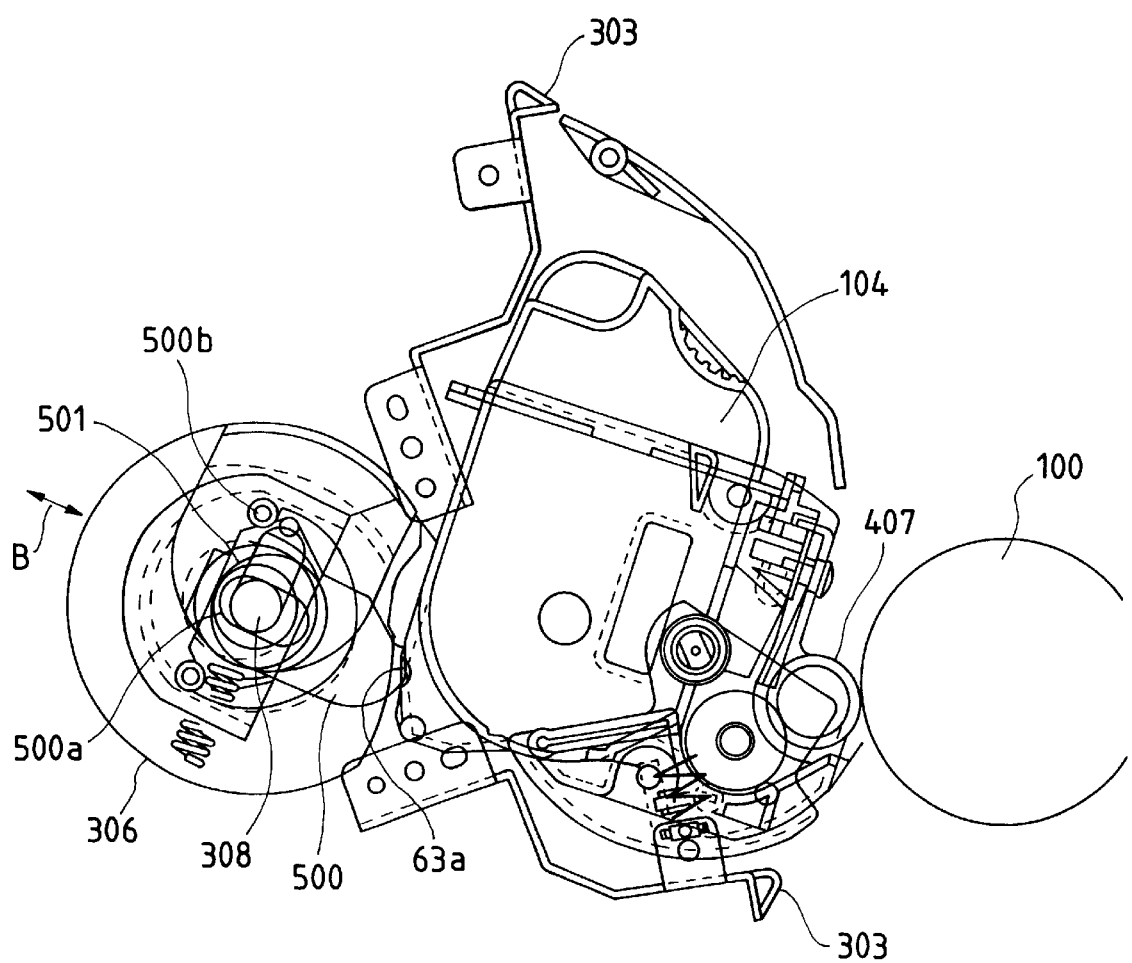
Figure 22:
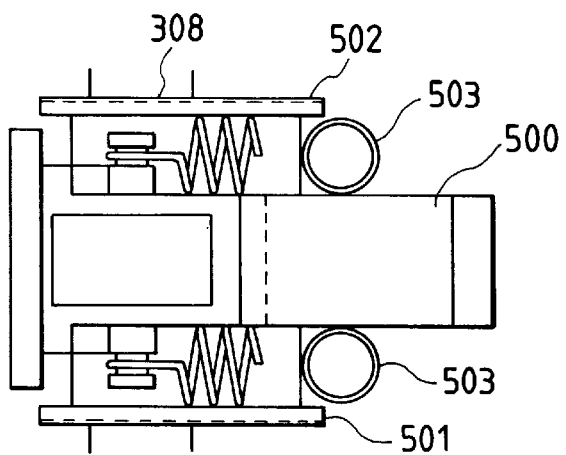
FIG. 22 is a plan view showing a main part of the pivot pressurizing mechanism of FIG. 20.
Figure 24:
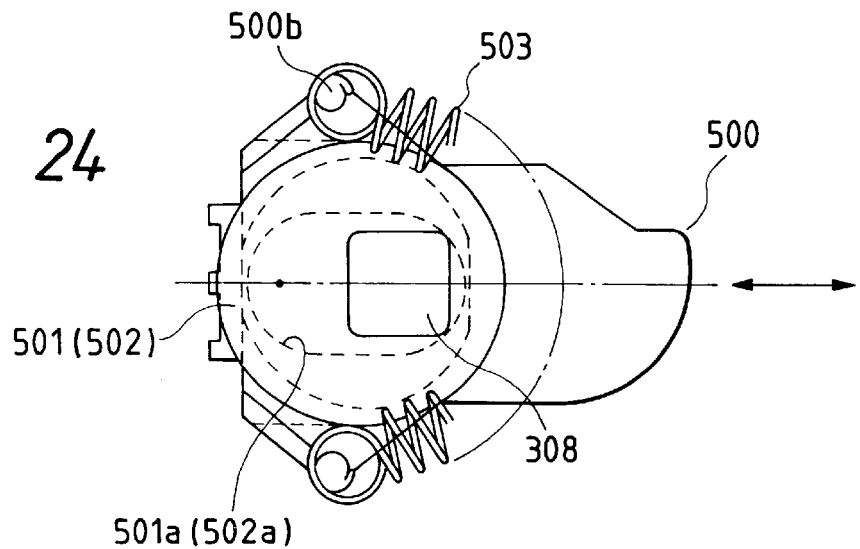

When the center shaft 308 is rotated, the pressure cams 501, 502 are rotated in accordance with the phase of the center shaft 308, so that the pressure member 500 can be shifted between an advanced pressurizing condition shown in FIGS. 21 and 23 and a retarded waiting position shown in FIGS. 20 and 24 by spring forces of the pressure springs 503 extending between the cams 501, 502 and the pressure member 500. The developing cartridges 104 mounted on the carcel 103 can be rotated around the pivot center members 401, 402 and pressurizing force receiving portions 63a provided at both longitudinal ends of the cartridge are pressurized by the pressure members 500. FIG. 20 shows a condition that the developing sleeve is spaced apart from the image bearing member 100, and FIG. 21 shows a condition that the developing sleeve is urged against the image bearing member 100. In this way, the pivot separate operation and the develop drive connection releasing operation and the develop contact abut releasing operation of the developing cartridge described in connection with the first embodiment are effected in synchronous with each other.

As mentioned above, according to the present invention, there can be provided an image forming apparatus in which the driving force can surely be transmitted to the developing units which can detachably be mounted to the main body of the apparatus.

Further, according to the present invention, there can be provided an image forming apparatus which can be operated smoothly without vibration and noise when the multi-color image is formed on the recording medium by switching the developing units (with respect to the photosensitive member) by using the switching means.

In addition, according to the present invention, there can be provided an image forming apparatus in which the voltage can surely be applied to the developing units.

What is claimed is:

1. An image forming apparatus comprising:
    a photosensitive member;
    a support member for detachably supporting a developing unit for developing a latent image formed on said photosensitive member, said developing unit including a developing part for receiving a driving force, said support member supporting said developing unit, wherein said developing unit is pivotally movable around an axis of rotation of said developing unit; and
    a driving force transmitting portion, provided on said support member, for transmitting the driving force to said developing part, wherein said driving force transmitting portion engages with said developing part in a direction of the axis of rotation and transmits said driving force to said developing part.

2. An image forming apparatus according to claim 1, further comprising switch means including a plurality of driving force transmitting portions for switching said developing unit supported by said support member with respect to said photosensitive member to form a multicolor image on a recording medium.

3. An image forming apparatus according to claim 2, wherein said plurality of driving force transmitting portions are shiftable in a direction of the axis of rotation,
    when each of said plurality of driving force transmitting portions are shifted toward said developing unit, said developing unit is engaged by said plurality of driving force transmitting portions,
    when said plurality of driving force transmitting portions are shifted in an opposite direction away from said developing unit, said developing unit is disengaged from said plurality of driving force transmitting portions.

4. An image forming apparatus according to claim 3, wherein said plurality of driving force transmitting portions are biased toward the opposite direction, and the image forming apparatus further comprises an abut member for shifting said plurality of driving force transmitting portions toward said developing unit by abutting against one end of said plurality of driving force transmitting portions.

5. An image forming apparatus according to claim 1, wherein said driving force transmitting portion comprises a plurality of driving force transmitting portions that transmit the driving force to said developing unit by rotating in a same direction that a developing roller provided in said developing unit is urged against said photosensitive member.

6. An image forming apparatus according to claim 3, further comprising an apparatus side contact for supplying a voltage to said developing unit to be engaged by and disengaged from a unit side contact provided on said developing unit, in synchronism with a shifting movement of said plurality of driving force transmitting portions along the direction of the axis of rotation.

7. An image forming apparatus according to claim 3, further comprising an urging member for urging said developing unit against said photosensitive member in synchronism with the shifting movement of said plurality of driving force transmitting portions along a direction of the axis of rotation.

8. An image forming apparatus according to claim 4, further comprising a rotatable drive source, wherein said plurality of driving force transmitting portions are driven,
when said rotatable drive source is rotated in a predetermined direction, and said abut member is driven,
when said rotatable drive source is rotated in a direction opposite to the predetermined direction.

9. An image forming apparatus according to claim 1, wherein said support portion detachably attaches a plurality of said developing units.

10. An image forming apparatus comprising:
a photosensitive member;
a support member for detachably supporting developing units for developing a latent image formed on said photosensitive member, said support member pivotally supporting said developing units;
a plurality of driving force transmitting portions, provided on said support member and disposed substantially on a same axis as an axis of rotation of said developing units, to transmit a driving force to said developing units supported by said support member, said plurality of driving force transmitting portions transmitting driving forces to said developing units by rotation thereof, said plurality of driving force transmitting portions being rotated in a direction that a developing roller provided in said developing units are urged against said photosensitive member, and said plurality of driving force transmitting portions engage with said developing units in a direction of the axis of rotation and transmit the driving force to said developing units; and
switch means for switching said developing units supported by said support member with respect to said photosensitive member to form a multicolor image on a recording medium.

11. An image forming apparatus according to claim 10, wherein said plurality of driving force transmitting portions are shiftable in a direction of the axis of rotation,
when said plurality of driving force transmitting portions are shifted toward said developing units, said developing units are engaged by said plurality of driving force transmitted portions,
when said plurality of driving force transmitting portions are shifted in an opposite direction away from said developing units, said developing units are disengaged from said plurality of driving force transmitted portions.

12. An image forming apparatus according to claim 11, wherein said plurality of driving force transmitting portions are biased toward the opposite direction, and the image forming apparatus further comprises an abut member for shifting said plurality of driving force transmitting portions toward said developing unit by abutting against one end of said plurality of driving force transmitting portions.

13. An image forming apparatus according to claim 11, further comprising an apparatus side contact for supplying a voltage to said developing units to be engaged by and disengaged from a unit side contact provided on said developing units, in synchronism with a shifting movement of said plurality of driving force transmitting portions along the direction of the axis of rotation.

14. An image forming apparatus according to claim 11, further comprising an urging member for urging said developing units against said photosensitive member in synchronism with the shifting movement of said plurality of driving force transmitting portions along the direction of the axis of rotation.

15. An image forming apparatus according to claim 12, further comprising a rotatable drive source, wherein said plurality of driving force transmitting portions are driven when said rotatable drive source is rotated in a predetermined direction, and said abut member is driven when said rotatable drive source is rotated in a direction opposite to the predetermined direction.

16. An image forming apparatus according to claim 1 or 10, wherein the axis of rotation is aligned on said support member.

17. A color electrophotographic image forming apparatus to which a process cartridge is detachably attachable, said apparatus comprising:
an electrophotographic photosensitive body;
plural attaching portions for detachably attaching a developing unit of a plurality of developing units for developing a latent image formed on said electrophotographic photosensitive body, wherein said attaching portion contains developers having different colors from each other, a rotary is rotated around an axis of rotation in such a manner that each of said plurality of developing units is serially moved to a position opposed to said electrophotographic photosensitive body, said attaching portions are provided on said rotary, and each of said plurality of developing units is pivoted around an axis of rotation of said plurality of developing units; and
a driving force transmitting portion for transmitting a driving force to said developing unit attached to said attaching portions, wherein said driving force transmitting portion engages with said developing unit attached to said attaching portions in a direction of the axis of rotation and transmits the driving force to said developing unit attached to said attaching portions.

18. An image forming apparatus according to claim 17, wherein said driving force transmitting portion comprises a plurality of driving force transmitting portions, shiftable in the direction of the axis of rotation,
when each of said plurality of driving force transmitting portions is shifted toward said developing unit attached to said attaching portions, said developing unit attached to said attaching portions is engaged by said plurality of driving force transmitting portions,
when said plurality of driving force transmitting portions are shifted in an opposite direction away from the developing unit attached to said attaching portions, said developing unit attached to said attaching portions is disengaged from said plurality of driving force transmitting portions.

19. An image forming apparatus according to claim 18, wherein said plurality of driving force transmitting portions are biased toward the opposite direction, and the image forming apparatus further comprises an abut member for shifting said plurality of driving force transmitting portions toward said developing unit attached to said attaching portions by abutting against one end of said plurality of driving force transmitting portions.

20. An image forming apparatus according to claim 18, wherein said plurality of driving force transmitting portions transmit the driving force to said developing unit by rotating in a same direction that a developing roller provided in said developing unit attached to said attaching portions is urged against said photosensitive member.

21. An image forming apparatus according to claim 18, further comprising an apparatus side contact for supplying voltage to said developing unit to be engaged by and disengaged from a unit side contact provided on said developing unit, in synchronism with a shifting movement of said plurality of driving force transmitting portions along the direction of the axis of rotation.

22. An image forming apparatus according to claim 18, further comprising an urging member for urging said developing unit against said photosensitive member, wherein said urging member urges said developing unit in synchronism with the shifting movement of said plurality of driving force transmitting portions along the direction of the axis of rotation.

23. A color electrophotographic image forming apparatus according to any one of claims 17 to 22, wherein a color of the developer is one of yellow, magenta, cyan and black.

* * * * *